Feb. 21, 1956 J. E. QUINN 2,735,291
WEIGHT AND CENTER OF GRAVITY COMPUTING APPARATUS
Filed Sept. 27, 1952
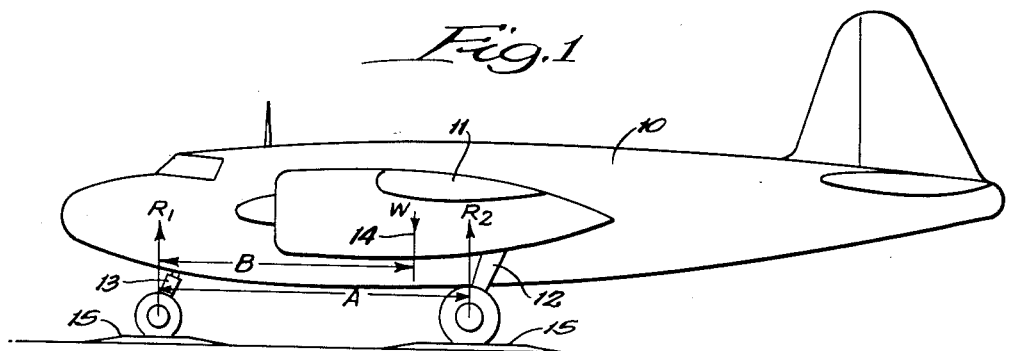
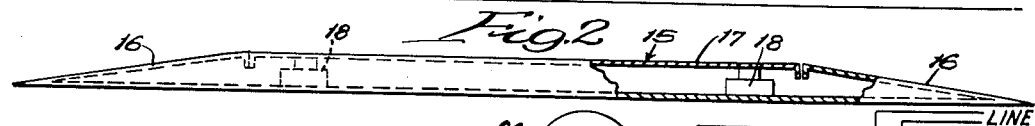
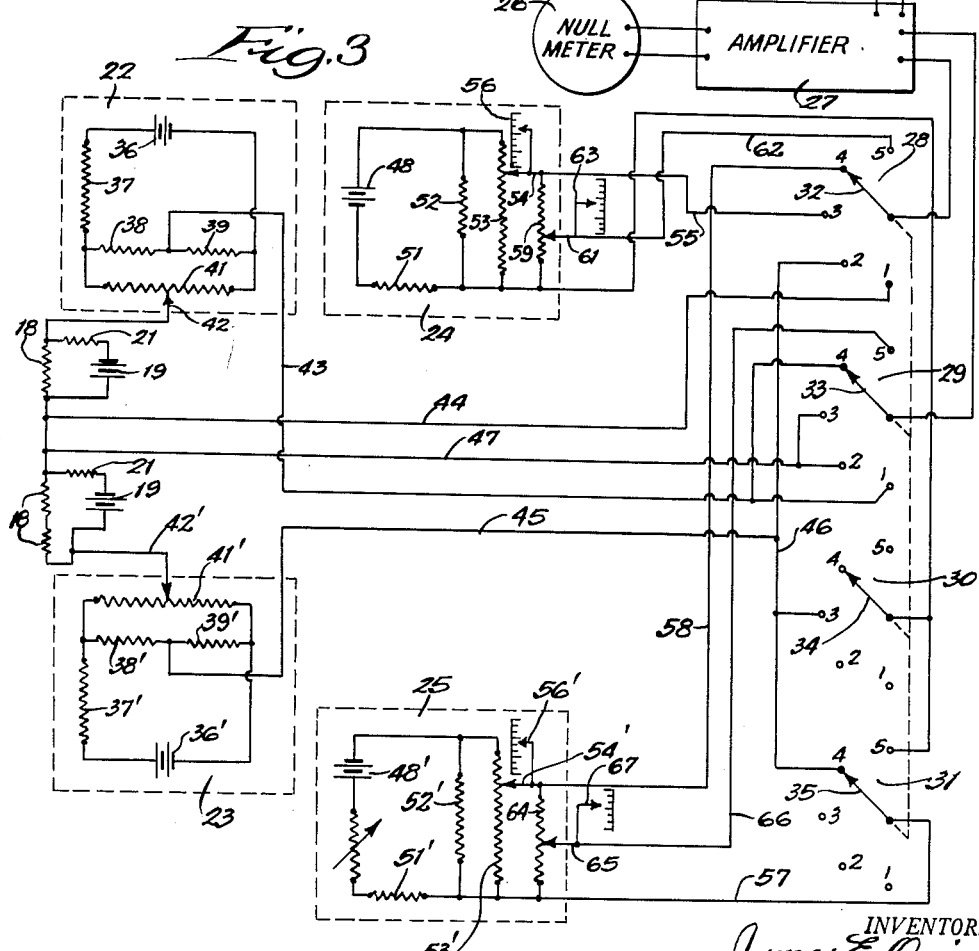
INVENTOR:
James E. Quinn,
BY
Bair, Freeman & Molinare
ATTORNEYS.

United States Patent Office 2,735,291
Patented Feb. 21, 1956

2,735,291

WEIGHT AND CENTER OF GRAVITY COMPUTING APPARATUS

James E. Quinn, Chicago, Ill., assignor to Streeter-Amet Company, Chicago, Ill., a corporation of Illinois Application September 27, 1952, Serial No. 311,931

4 Claims. (Cl. 73—65)

This invention relates to weight and center of gravity computing apparatus and more particularly to an electrical apparatus to produce an accurate measurement and indication of the total weight and the position of the center of gravity of objects of various types.

The invention is particularly applicable to a determination of the weight and center of gravity of fluid supported devices such as aircraft, or watercraft, or projectiles traveling through air or water. Although the invention is particularly described in connection with aircraft, it will be apparent that the description is equally applicable to many other types of devices and that aircraft are selected only as an example of the types of objects with which the apparatus of the invention can be used.

It has been proposed heretofore to provide a mechanism, either built in as a part of an aircraft or as a separate mechanism to support an aircraft, for determining the total weight and fore and aft position of the center of gravity of the aircraft. Such devices have been either very complicated and expensive to build or have been complicated and slow to operate.

It is one of the objects of the present invention to provide a weight and center of gravity computing apparatus which is relatively simple in its construction and which is easy and rapid in its operation.

Another object is to provide a computing apparatus which can be used with any size or type of object to determine its weight and center of gravity position.

Still another object is to provide a computing apparatus in which the readings of the necessary values can be taken easily and quickly and set in the mechanism so that computation of the center of gravity can be completed at a later time if desirable.

A further object is to provide a computing apparatus in which indications of the necessary values are obtained by manually adjustable devices which are adjusted to obtain a null balance with the various values of the object to be measured.

A still further object is to provide a computing apparatus which apparatus operates entirely electrically and is, therefore, compact, rapid and accurate in its operation.

The above and other objects and advantages of the invention will be more readily apparent from the following description when read in connection with the accompanying drawing, in which Figure 1 is a side elevation illustrating the manner of weighing and computing the center of gravity of an aircraft with an apparatus embodying the invention.

Figure 2 is a side elevation with parts in section of one of the load supporting devices, and Figure 3 is a circuit diagram.

The apparatus as illustrated in Figure 1 is used to obtain the total weight and to compute the fore and aft position of the center of gravity of a conventional aircraft. As shown the aircraft comprises a main fuselage 10 having wings 11 projecting from the sides thereof and a conventional tri-cycle landing gear including a pair of main wheel units 12 and a nose wheel unit 13. Two landing wheel units 12 are provided lying to the rear of the center of gravity, as indicated at 14, and a single nose wheel unit 13 is provided well forward of the center of gravity. For many types of service it is desirable to obtain an indication of the total weight of the aircraft when loaded and of the position of its center of gravity under load conditions.

For this purpose a plurality of weight supporting devices indicated generally at 15 are provided. The weight supporting devices 15 are preferably separate units which can be positioned on a floor or run-way to receive and support the several landing gear units of the aircraft and which are designed to produce indicating forces proportional to the loads supported thereon. For an aircraft of the type shown, three such units would be required to support the two rear landing wheels and the nose wheel. As best seen in Figure 2, each of the units 15 is a hollow structure terminating at its ends in tapered ramps 16 so that the landing wheels of the aircraft can roll easily onto and from the units. The center portion of the unit comprises a platform 17 on which the landing wheels can rest and which is supported by a plurality of electrical load cells 18. Preferably, four load cells 18 are provided at the four corners of the platform although more or less load cells could be employed as desired.

The load cells 18 are preferably standard strain gauge units whose resistance changes with changes in the load thereon and which may be connected with sources of voltage, such as batteries 19 as shown in Figure 3, with resistors 21 in series therewith to produce changes in voltage across the strain gauge resistors as the load varies. The circuit as illustrated in Figure 3 is a more or less typical circuit of this type, although it will be apparent that the strain gauges could be included in bridge circuits or any other types of circuits to produce a voltage change in response to load as desired.

The load supporting devices 15 for the main landing wheels 12 may be connected in series as indicated by the lower pair of resistors 18 in Figure 3 to act as a single unit and to produce a voltage change corresponding to the total weight supported on the main landing wheels. The load supporting device for the nose wheel is separately connected in the circuit as indicated by the upper resistor 18 of Figure 3. The voltages produced by the load supporting devices are adapted to be balanced in different manners against voltages produced by voltage producing units, as indicated at 22, 23, 24 and 25. The voltage balance is indicated by a null balance meter 26 connected into the circuit through an amplifier 27 and through five position gang switches 28, 29, 30 and 31.

Each of the switches has five contacts numbered 1 through 5, and the switches are interconnected so that each switch simultaneously establishes a circuit with the same numbered contact. The switches include movable wipers 32, 33, 34 and 35 which are connected to move together over the respective switch contacts to establish the different circuit conditions. The wipers 32 and 33 of the switches 28 and 29 are connected to the amplifier input terminals, as shown, to supply voltages thereto. The amplifier and null balance meter are so arranged that when the voltages at the wipers 32 and 33 are equal, the meter will produce a zero indication. When the voltage at the wiper 32 is greater that that at the wiper 33, the meter will deflect in one direction and when the voltage conditions are reversed the meter will deflect in an opposite direction. Thus, an accurate and rapid indication is attained of the voltage balance conditions in the several circuits to which the switches are connected so that the circuits can be easily adjusted to produce the desired null balance condition.

The voltage producing units 22 and 23 are calibrating units to calibrate the load supporting devices respectively. The unit 22 is adapted to calibrate the nose wheel supporting device 15, and for this purpose includes a source of voltage, shown as a battery 36, connected through a series resistor 37 across a pair of resistors 38 and 39. An adjustable potentiometer resistor 41 is connected in parallel with the resistors 38 and 39, and is engaged by a wiper 42 connected to one end of the nose wheel load supporting device. A lead 43 from the mid point between resistors 38 and 39 is connected to contact 1 of the switch 29 and a lead 44 from the opposite side of the nose wheel supporting device is connected to contact 1 of the switch 28. The number 1 contacts of the switches 30 and 31 are blank.

With the switches in the number 1 position, the nose wheel load supporting device is connected in series with the voltage producing unit 22 to the amplifier input terminals. This connection is made when there is no load on the load supporting device and at this time the wiper 42 is adjusted until the meter 26 reads zero. Therefore the calibrating unit 22 is producing a voltage which exactly counteracts the no load voltage of the nose wheel supporting device so that when a load is placed on the nose wheel supporting device, the voltage developed between leads 43 and 44 will be proportional to the load.

The main wheel load supporting devices are similarly calibrated by the unit 23 whose construction is the same as that of the unit 22 and in which like parts are indicated by the same reference numerals primed. The mid point between resistors 38' and 39' of this unit is connected through leads 45 and 46 to contact 2 of switch 28, to contact 3 of switch 30, and to contact 4 of switch 31. The opposite side of the load supporting devices is connected through lead 47 to contacts 2 and 3 of switch 29. Contacts 2 of switches 30 and 31 are blank.

With the switches in the number 2 position, the main wheel supporting devices are connected in series with the calibrating unit 23 through the number 2 contacts of switches 28 and 29 to the amplifier so that the main wheel supporting devices can be calibrated by adjusting the wiper 42'. Therefore, when a load is placed on the main wheel supporting devices the voltage developed between leads 45 and 47 will be proportional to the weight on the main wheel supporting devices.

To obtain an indication of the total weight of the aircraft, the several load supporting devices are connected in series so that the total voltage produced will be proportional to the total weight. The weight, as indicated in Figure 1, may be considered to be proportional to a force W acting downward at the center of gravity. This force is counterbalanced by forces $R_1$ and $R_2$ acting upward at the positions of the landing gear elements and spaced apart a distance A. As indicated the center of gravity 14 is spaced a distance B from the nose wheel support and from the supporting force $R_1$.

The total weight W as indicated by this diagram is equal to $R_1$ plus $R_2$ and is therefore indicated by adding the voltages produced by the main wheel and nose wheel supporting devices. Since the aircraft is in a static condition during weighing, the summation of the moments about any one point must be equal to zero and from this fact the distance B of the center of gravity from one of the supporting points can easily be computed. Thus, the moment about the nose wheel produced by the total weight of the aircraft is equal to W times B and this must equal to the moment produced by the force $R_2$, which is equal to $R_2$ times A. The distance B can therefore easily be obtained by dividing $R_2$ times A by W.

With the switches in position 3 and with the aircraft on the load supporting devices, the force $R_2$ is measured and stored in the mechanism. When the switches are in position 3 the lead 45 is connected through the switch 30 to the voltage producing device 24. This device is a potentiometer unit including a source of voltage, such as a battery 48, connected through a series resistor 51 and across a loading resistor 52 to a potentiometer resistor 53. A movable wiper 54 engages the potentiometer resistor and is connected through a lead 55 to terminal number 3 of the switch 28. Thus, in position 3, the switch 28 supplies the voltage produced by the unit 24 to one of the amplifier input terminals. The voltage produced by the main wheel supporting devices is supplied through the lead 47 and the switch 29 to the other amplifier input terminal. With the switches in position 3, the wiper 54 is adjusted until the meter 26 indicates zero at which time the potentiometer 53 is set to produce a voltage equal and opposite to the voltage produced by the main wheel supporting devices. This value is equal to the force $R_2$ as indicated in Figure 1, and may be indicated by an indicator 56 connected to the wiper 54 and which may directly indicate the load on the main landing wheels.

With the switches in position number 4, the total weight of the aircraft is measured and stored in the voltage producing unit 25. In this position of the switches, terminal 4 of the switch 29 is connected to the lead 43, and lead 45 is connected through switch 31 to a lead 57 connected to the voltage producing unit 25. This unit is similar to the voltage producing unit 24 and parts therein corresponding to like parts in the unit 24 are indicated by the same reference numerals primed. The wiper 54' of the variable potentiometer is connected through a lead 58 to the terminal 4 of the switch 28 and through this switch to the other input terminal of the amplifier.

Thus, with the switches in position 4 the several load supporting devices are connected in voltage aiding series with each other and in voltage opposition to the voltage producing device 25. The wiper 54' of the voltage producing device 25 is adjusted until the meter 26 indicates zero so that the voltage produced thereby is proportional to the total weight on the several load supporting devices. This value corresponding to the total weight of the aircraft is indicated at 56'.

To obtain the center of gravity position according to the formula set forth above, it is necessary to multiply the voltage produced by the unit 24 by a value corresponding to the distance A between the main landing wheels and the nose wheel and to divide this value by a voltage corresponding to the total weight W. For this purpose, a potentiometer resistor 59 is connected across the wiper 54 and the lower end of the resistor 53 of the unit 24 and has a movable wiper 61 thereon connected through a lead 62 to terminal 5 of the switch 28. The position of the wiper 61 may be indicated by an indicator 63. In a similar manner, a potentiometer resistor 64 is connected between the wiper 54' and the lead 57 and has an adjustable wiper 65 thereon connected through a lead 66 to terminal 5 of the switch 29. The position of the wiper 65 may be indicated by an indicator 67.

With the switches in position 5, the wipers 61 and 65 are connected in voltage opposition to the input terminals of the amplifier 27 so that the meter 26 will indicate any difference in the voltages produced thereby. The wiper 61 is set in accordance with the known distance A, as indicated by the indicator 63, so that the voltage between wiper 61 and the lower end of the resistor 53 is proportional to the product $R_2$ times A. The lower end of the resistor 53 is connected through the switch 31 to the lead 57 and the wiper 65 is adjusted until the meter 26 indicates zero. Adjustment of the wiper 65 as indicated by the indicator 67 corresponds to the unknown distance B and indicates the distance between the nose wheel 13 and the center of gravity 14 of the aircraft.

In using the apparatus, it will be seen that the only manual adjustment independent of the meter 26 is the adjustment of the wiper 61 to correspond to the distance A between the main wheels and the nose wheel of the aircraft. It will be apparent that for other types of devices this distance could be such as to correspond to the distance between more or less arbitrarily selected supporting points. Setting of the other adjustable devices such as 54, 54' and 65 is accomplished rapidly and accurately by observation of the meter 26 to bring the meter back to its zero position. Thus, with the apparatus of the present invention computations of the total weight and the center of gravity position of many different types of devices is attained rapidly and with a high degree of accuracy. It will also be noted that for extremely rapid operations on a number of similar objects, the setting of the wiper 61 need not be changed and the settings of wipers 54 and 54' can be obtained very quickly with the object on the supporting devices. The object can then be removed and while the next object to be weighed is being placed on the supporting devices, the center of gravity computation can be proceeded with.

While one embodiment of the invention has been shown and described in detail, it will be understood that this is for the purpose of illustration only and is not to be taken as a definition of the scope of the invention, reference being had for this purpose to the appended claims.

What is claimed is:

1. A weight and center of gravity computing apparatus comprising a pair of weight supporting devices adapted to engage and support spaced points on an object whose weight and center of gravity are to be determined, means in said devices to produce forces proportional to the weight supported by the devices respectively, a pair of adjustable force producing units, a force indicating instrument, adjustable controlling means connected to the devices and the instrument and having one position in which it connects one of the devices and one of the units to the instrument to indicate the difference in the forces produced thereby, the controlling means having a second position in which it connects both of said devices in series aiding relation to each other and the other of the units to the instrument to indicate the difference in the sum of the forces produced by the device and the force produced by the unit, a pair of adjustable force multiplying units connected to the controlling means and the force producing units to multiply the forces produced by the units respectively, one of the force multiplying units being adjustable in accordance with the distance between said points on the object and the other in accordance with the distance from one of said points to the center of gravity of the object, and the controlling means having a third position in which it connects the force multiplying units to the instrument to measure the difference in the forces developed by the force multiplying units.

2. A weight and center of gravity computing apparatus comprising a pair of weight supporting devices adapted to engage and support spaced points on an object whose weight and center of gravity are to be determined, means in said devices to produce forces proportional to the weight supported by the devices respectively, a pair of adjustable force producing units, a pair of calibrating force producing units, a force balance indicating instrument, a pair of adjustable force multiplying units connected respectively to the force producing units to multiply the forces produced thereby, and adjustable controlling means connected to the devices, the adjustable force producing units, the calibrating force producing units, the instrument and the multiplying units and having a first position to connect one of the devices and one of the calibrating force producing units to the instrument in opposition to each other to indicate the difference in the forces produced thereby, a second position to connect the other of the devices and the other of the calibrating force producing units to the instrument in opposition to each other to indicate the difference in the forces produced thereby, a third position to connect one of the devices and one of the force producing units to the instrument in opposition to each other to indicate the difference in the forces produced thereby, a fourth position to connect both of the devices in series aiding relation to each other and the other force producing unit to the instrument to indicate the difference in the sum of the forces produced by the devices and the forces produced by the unit, and a fifth position to connect the force multiplying units to the instrument in opposition to each other to indicate the difference in the forces produced thereby.

3. A weight and center of gravity computing apparatus comprising a pair of load cell devices to support spaced points on an object whose weight and center of gravity are to be determined and to produce electrical voltages proportional to the weights supported thereby, a pair of adjustable voltage producing units, a pair of adjustable potentiometer units connected to the voltage producing units respectively to multiply the voltages produced thereby, a voltage indicating instrument, and switching means electrically connected to the load cell devices, the voltage producing units, the potentiometer units and the instrument and having a first position to connect one of the devices and one of the voltage producing units to the instrument in voltage opposition to each other to indicate the difference in the voltages produced thereby, a second position to connect both of the devices in series aiding relation and the other voltage producing unit to the instrument in voltage opposition to indicate the difference in the total voltage produced by the devices and the voltage produced by the unit, and a third position to connect the potentiometer units to the instrument in voltage opposition to each other to indicate the difference in the voltages produced thereby.

4. A weight and center of gravity computing apparatus comprising a pair of load cell devices to support spaced points on an object whose weight and center of gravity are to be determined and to produce electrical voltages proportional to the weights supported thereby, a pair of adjustable voltage producing units, a pair of adjustable potentiometer units connected to the voltage producing units respectively to multiply the voltages produced thereby, a voltage indicating instrument, a pair of adjustable voltage producing calibrating units connected in voltage opposition to the devices, and switching means electrically connected to the load cell devices, the adjustable voltage producing units, the adjustable potentiometer units, the instrument and the calibrating units and having a first position to connect one of the devices and its associated calibrating unit to the instrument in voltage opposition to each other to indicate the difference in voltages produced thereby, a second position to connect the other of the devices and its associated calibrating unit to the instrument in voltage opposition to each other to indicate the difference in voltages produced thereby, a third position to connect one of the devices and one of the voltage producing units in voltage opposition to the instrument to indicate the difference in the voltages produced thereby, a fourth position to connect the two devices in series with each other and the other voltage producing unit in voltage opposition to the instrument to indicate the difference in the total voltage produced by the devices and the voltage produced by the unit, and a fifth position to connect the potentiometer units in voltage opposition to the instrument to indicate the difference in the voltages produced thereby, one of the potentiometer units being adjustable in accordance with the distance between said points on the object and the other in accordance with the distance from one of said points to the center of gravity of the object.

References Cited in the file of this patent

UNITED STATES PATENTS

| | | |
|---|---|---|
| 2,373,504 | Schlieben | Apr. 10, 1945 |
| 2,443,045 | Magruder et al. | June 8, 1948 |
| 2,540,807 | Berry | Feb. 6, 1951 |
| 2,615,330 | Blackmon et al. | Oct. 28, 1952 |